United States Patent
He et al.

(10) Patent No.: US 9,565,695 B2
(45) Date of Patent: Feb. 7, 2017

(54) APPARATUS AND METHOD FOR TRANSMITTING UPLINK SCHEDULING REQUEST IN MOBILE COMMUNICATION SYSTEM

(75) Inventors: Hong He, Beijing (CN); Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/636,845

(22) PCT Filed: Apr. 7, 2011

(86) PCT No.: PCT/KR2011/002449
§ 371 (c)(1),
(2), (4) Date: Sep. 24, 2012

(87) PCT Pub. No.: WO2011/126320
PCT Pub. Date: Oct. 13, 2011

(65) Prior Publication Data
US 2013/0016707 A1 Jan. 17, 2013

(30) Foreign Application Priority Data

Apr. 7, 2010 (CN) .......................... 2010 1 0142068

(51) Int. Cl.
*H04J 3/00* (2006.01)
*H04W 72/12* (2009.01)
(Continued)

(52) U.S. Cl.
CPC ........ *H04W 72/1284* (2013.01); *H04L 1/0031* (2013.01); *H04L 1/1671* (2013.01);
(Continued)

(58) Field of Classification Search
CPC . H04W 72/1284; H04L 1/0031; H04L 1/1671; H04L 1/1861; H04L 5/0055; H04L 5/0057
(Continued)

(56) References Cited

U.S. PATENT DOCUMENTS 8,068,466 B2 * 11/2011 Muharemovic et al. ..... 370/335
8,179,857 B2 * 5/2012 Kwon et al. ................. 370/330
(Continued)

FOREIGN PATENT DOCUMENTS

KR  10-2009-0034051 A   4/2009
WO  2008153298 A1  12/2008
(Continued)

OTHER PUBLICATIONS

Samsung; Concurrent PUSCH and PUCCH Transmissions; 3GPP TSG RAN WG1 #60; R1-101145; internet <URL: http://www.3gpp.org/ftp/tsg_ran/WG1_RL1/TSGR1_60/Docs/R1-101145.zip; Feb. 16, 2010.

(Continued)

*Primary Examiner* — Kevin Mew
(74) *Attorney, Agent, or Firm* — Jefferson IP, Law LLP

(57) ABSTRACT

A method and apparatus for transmitting an uplink Scheduling Request (SR) are provided. The method includes, obtaining a SR subframe configuration by receiving signaling, and transmitting SR information to a Base Station (BS) by using physical resources of another non-SR channel for transmitting other uplink control information. By applying the present invention, the SR, ACKnowledgement/Non-ACKnowledgement (ACK/NACK) or Channel Quality Indicator (CQI) information is returned to a BS when low Constant Modulus (CM) characteristic of an uplink Component Carrier (CC) is ensured.

26 Claims, 13 Drawing Sheets

(51) Int. Cl.
  *H04L 1/00* (2006.01)
  *H04L 1/16* (2006.01)
  *H04L 1/18* (2006.01)
  *H04L 5/00* (2006.01)

(52) U.S. Cl.
  CPC .......... *H04L 1/1861* (2013.01); *H04L 5/0055* (2013.01); *H04L 5/0057* (2013.01)

(58) Field of Classification Search
  USPC ........ 370/204, 208, 210, 335–336, 342–343, 370/345, 465, 470–474, 476, 479–480, 370/498; 455/69; 709/226, 229
  See application file for complete search history.

(56) References Cited

U.S. PATENT DOCUMENTS

| | | | |
|---|---|---|---|
| 8,325,667 B2 * | 12/2012 | Kishiyama et al. | 370/329 |
| 8,331,215 B2 * | 12/2012 | Shen | H04L 1/1614 370/206 |
| 8,351,370 B2 * | 1/2013 | Kim et al. | 370/322 |
| 8,406,182 B2 * | 3/2013 | Tiirola et al. | 370/329 |
| 8,477,695 B2 * | 7/2013 | Zhang | 370/329 |
| 2006/0079257 A1 | 4/2006 | Iochi et al. | |
| 2009/0022110 A1 * | 1/2009 | Muharemovic | H04L 1/1671 370/336 |
| 2009/0067391 A1 * | 3/2009 | Shen | H04L 1/0027 370/336 |
| 2009/0109908 A1 * | 4/2009 | Bertrand et al. | 370/329 |
| 2009/0109917 A1 * | 4/2009 | Pajukoski et al. | 370/329 |
| 2009/0175159 A1 | 7/2009 | Bertrand et al. | |
| 2009/0181691 A1 | 7/2009 | Kotecha et al. | |
| 2009/0196247 A1 | 8/2009 | Fan et al. | |
| 2009/0201869 A1 * | 8/2009 | Xu | H04L 1/1671 370/329 |
| 2009/0219897 A1 | 9/2009 | Pajukoski et al. | |
| 2009/0274100 A1 * | 11/2009 | Montojo | H04L 1/1614 370/328 |
| 2009/0316811 A1 * | 12/2009 | Maeda et al. | 375/260 |
| 2010/0067461 A1 * | 3/2010 | Kwak | H04L 1/0026 370/329 |
| 2010/0080184 A1 | 4/2010 | Tseng | |
| 2010/0208672 A1 | 8/2010 | Chun et al. | |
| 2011/0032887 A1 * | 2/2011 | Kishiyama et al. | 370/329 |
| 2011/0205981 A1 * | 8/2011 | Koo et al. | 370/329 |
| 2012/0213193 A1 * | 8/2012 | Kwon et al. | 370/330 |
| 2013/0223396 A1 * | 8/2013 | Han et al. | 370/329 |
| 2013/0286988 A1 * | 10/2013 | Zhang | 370/329 |
| 2015/0078225 A1 * | 3/2015 | Yang | H04L 1/1854 370/280 |
| 2015/0230238 A1 * | 8/2015 | Kim | H04J 13/16 370/329 |

FOREIGN PATENT DOCUMENTS

| | | |
|---|---|---|
| WO | WO 2009020358 A1 * | 2/2009 |
| WO | WO 2009045026 A2 * | 4/2009 |
| WO | 2009/100217 A2 | 8/2009 |

OTHER PUBLICATIONS

Panasonic; Simultaneous transmission of Scheduling request indicator and ACK/NACK information for LTE-Advanced; 3GPP TSG RAN WG1 Meeting #60bis; R1-102026; internet <URL:http://www.3gpp.org/ftp/tsg_ran/WG1_RL1/TSGR1_60b/Docs/R1-02026.zip>; Apr. 6, 2010.

Samsung; Concurrent transmission of Scheduling Request indicator and ACK/NACK information for LTE-Advanced; 3GPP TSG RAN WG1 #61; R1-103004; internet <URL:http://www.3gpp.org/ftp/tsg_ran/WG1_RL1/TSGR1_61/Docs/R1-103004.zip>; May 4, 2010.

Texas Instruments, ACK/NAK DTX Detection for Concurrent Transmission of ACK/NAK and SRI, 3GPP TSG RAN WG1 #53, R1-081986, May 5, 2008, Kansas City, MO, USA.

Panasonic, "Simultaneous transmission of Scheduling request indicator and ACK/NACK Information for LTE-Advanced", R1-102026, Apr. 12-16, 2010, Beijing, China.

Sharp, "A simple PUCCH TxD for Formats 2/2a/2b for LTE-Advanced", R1-101378, Feb. 22-26, 2009, San Francisco, United States.

Huawei, "Multiplexing of Scheduling Request Indicator", R1-073521, Aug. 20-24, 2007, Athens, Greece.

Panasonic, "Simultaneous transmission of Scheduling request indicator and ACK/NACK information for LTE-Advanced", 3GPP TSG RAN WG1 Meeting #60bis, R1-102026, Apr. 12-16, 2010, pp. 1-6, Beijing, China.

* cited by examiner

APPARATUS AND METHOD FOR TRANSMITTING UPLINK SCHEDULING REQUEST IN MOBILE COMMUNICATION SYSTEM

PRIORITY

This application is a National Stage application under 35 U.S.C. §371 of an International application filed on Apr. 7, 2011 and assigned application No. PCT/KR2011/002449, and claims the benefit under 35 U.S.C. §365(b) of a Chinese patent application filed in the Chinese Industrial Property Office on Apr. 7, 2010 and assigned Serial No. 201010142068.5, the entire disclosures of which are hereby incorporated by reference.

BACKGROUND OF INVENTION

1. Field of the Invention

The present invention relates to mobile communication technologies.

2. Description of the Related Art

In Long Term Evolution (LTE) systems, uplink control information includes ACKnowledgement/Non-ACKnowledgement (ACK/NACK) of a downlink data packet, a Channel Quality Indicator (CQI), a Rank Indicator (RI) for downlink Multi-input Multi-output (MIMO) feedback, a Precoding Matrix Indicator (PMI) and a Scheduling Request (SR).

FIG. 1A is a schematic diagram illustrating a SR control channel in a mobile communication system according to the related art; and FIG. 1B is a schematic diagram illustrating an uplink ACK/NACK control channel in a mobile communication system according to the related art.

Similar to the structure of the uplink ACK/NACK control channel shown in FIG. 1B, the structure of the uplink SR control channel for transmitting SR information, as shown in FIG. 1A, is a two-dimensional orthogonal channel structure of different circular shifts and time domain orthogonal grouping expansion of a basic Constant Amplitude Zero Auto Correlation (CAZAC) sequence. In the LTE system, fixed SR resources are distributed to each User Equipment (UE) for sending the SR information, and each SR is sent by using a method of On-Off Key (OOK).

In the LTE system, when needing to apply a new uplink resource scheduling, the UE sends a SR a modulation symbol, which is in a SR subframe configured by the UE, so as to request a new uplink data resource. The SR in this case is referred to as a positive SR. When the UE does not have a need for uplink resource scheduling, the SR is not sent on a distributed SR channel. The SR in this case is referred to as a negative SR. In order to ensure a low Constant Modulus (CM) characteristic of uplink signals, it is defined in the LTE system that, if the SR and the ACK/NACK are transmitted in the same sub-frame, for the positive SR, the UE sends the ACK/NACK on the distributed SR channel; and for the negative SR, the UE sends the ACK/NACK on a distributed ACK/NACK channel.

Along with the continuous evolution of the LTE technology, an LTE-Advanced (LTE-A) system has been developed. In the LTE-A system, in order to improve a peak speed rate of the whole system, a method of Carrier Aggregation (CA) is used to implement configurable system bandwidth, and each carrier unit is referred to as a Component Carrier (CC). An LTE UE can work normally at each CC, which is shown in FIG. 2.

FIG. 2 is a schematic diagram illustrating a structure of a radio frame in a mobile communication system according to the related art.

Referring to FIG. 2, a radio frame 210 includes a plurality of subframes 220. A length of the radio frame 210 may be 10 ms, and a length of the subframe 220 may be 1 ms. The subframe 220 consists of a plurality of CCs 230-1 to 230-5 in the frequency domain. A bandwidth of each of the CCs 230-1 to 230-5 may be 20 M, and total bandwidth may be 100 M.

In view of partition of radio spectrum of the related art, in a conference of the $3^{rd}$ Generation Partnership Project (3GPP) Radio Access Network (RAN) 4 work groups, operators of the LTE-A system propose distributing the CC configured in the LTE-A system into two different frequency bands, which is shown in FIG. 3.

FIG. 3 is a schematic diagram illustrating examples of CC allocations in a mobile communication system according to the related art.

In addition, in order to reduce complexity of LTE-A terminals, it is defined in the LTE-A criterion by the 3GPP RAN 4 that, in a future LTE-A system, when the UE configures multiple downlink and uplink CCs, all the SR and CQI information are sent in the same CC, and downlink data ACK/NACK of different CCs are sent in a certain single CC. Since it is important to ensure the low CM characteristic of the uplink single CC for a receiving capability of uplink control information, there is a technical problem needed to be addressed, which is how to return the SR, ACK/NACK or CQI information to a BS at the same time when uplink CM is minimized. However, in the related art, no method is provided for returning the SR, ACK/NACK or CQI information to the BS when the low CM characteristic of the uplink CC is ensured as much as possible.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide an apparatus and a method for transmitting an uplink Scheduling Request (SR) information in a mobile communication system.

Another aspect of the present invention is to provide an apparatus and a method for increasing efficiency of transmitting an uplink SR information in a mobile communication system.

Another aspect of the present invention is to provide an apparatus and a method for transmitting an uplink SR information with other uplink control information in a mobile communication system.

In accordance with an aspect of the present invention, a method for transmitting an uplink SR information is provided. The method includes obtaining a SR subframe configuration by receiving signaling, and transmitting SR information to a Base Station (BS) by using physical resources of another non-SR channel for transmitting other uplink control information.

In accordance with another aspect of the present invention, an apparatus for transmitting an uplink SR arranged to implement the above method is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a method for transmitting an uplink scheduling requirement. Exemplary embodiments of the present invention provide an apparatus and a method for transmitting uplink Scheduling Request (SR) information in a mobile communication system. Hereinafter, the present disclosure uses technical terms and representations defined in the Long Term Evolution (LTE) standard. However, the present invention is not limited the technical terms and representations, and is applicable to a communication system based on another standard.

Figure 1A:
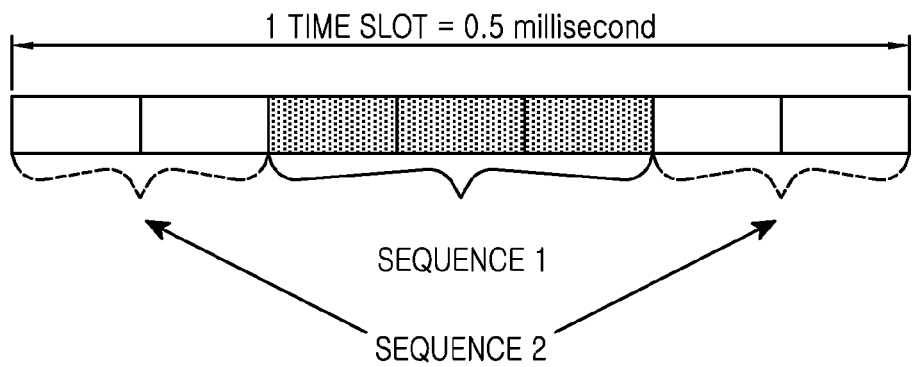
FIG. 1A is a schematic diagram illustrating a Scheduling Request (SR) control channel in a mobile communication system according to the related art.
Figure 1B:
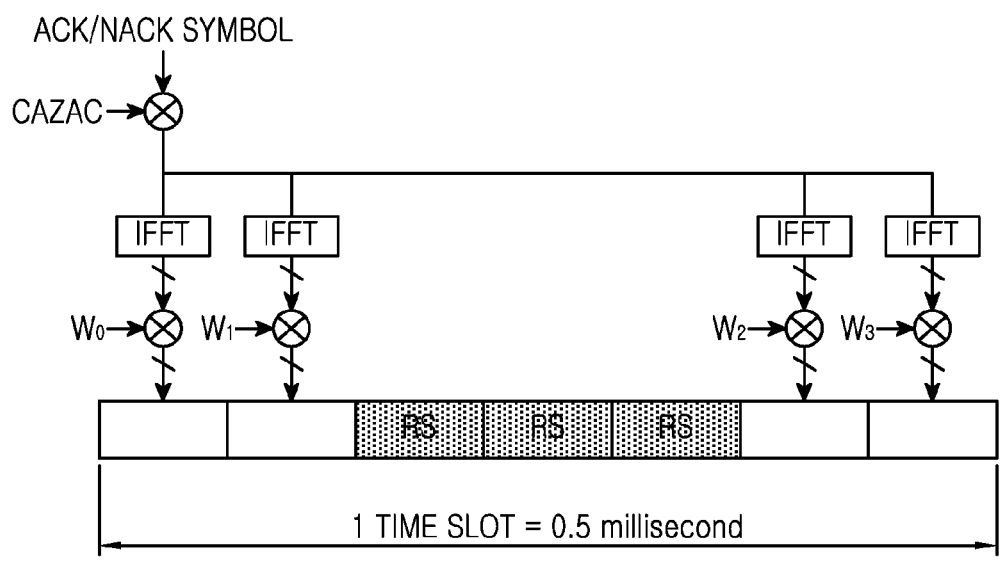
FIG. 1B is a schematic diagram illustrating an uplink ACKnowledgement/Non-ACKnowledgement (ACK/NACK) control channel in a mobile communication system according to the related art.
Figure 2:
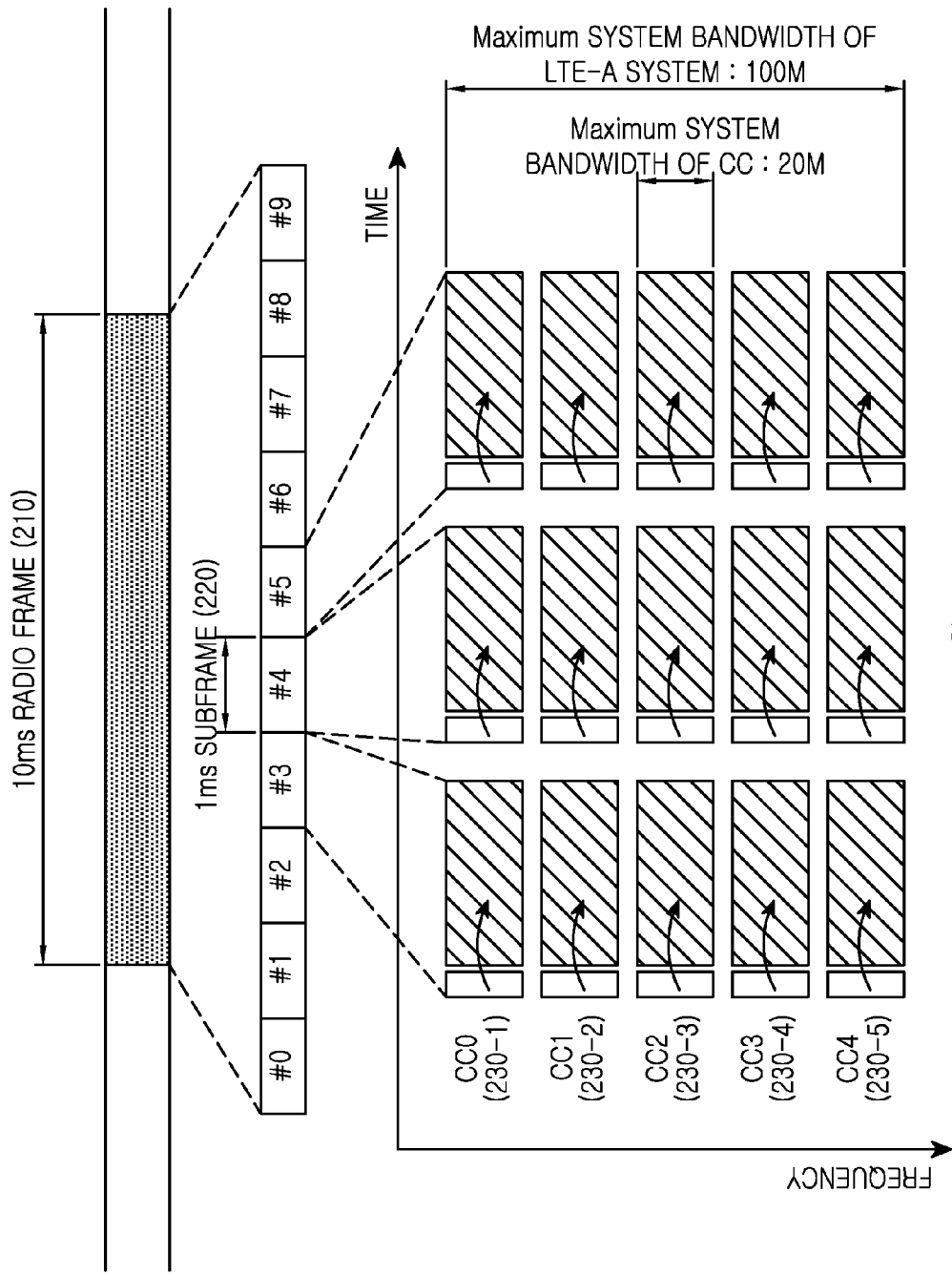
FIG. 2 is a schematic diagram illustrating a structure of a radio frame in a mobile communication system according to the related art.
Figure 3:
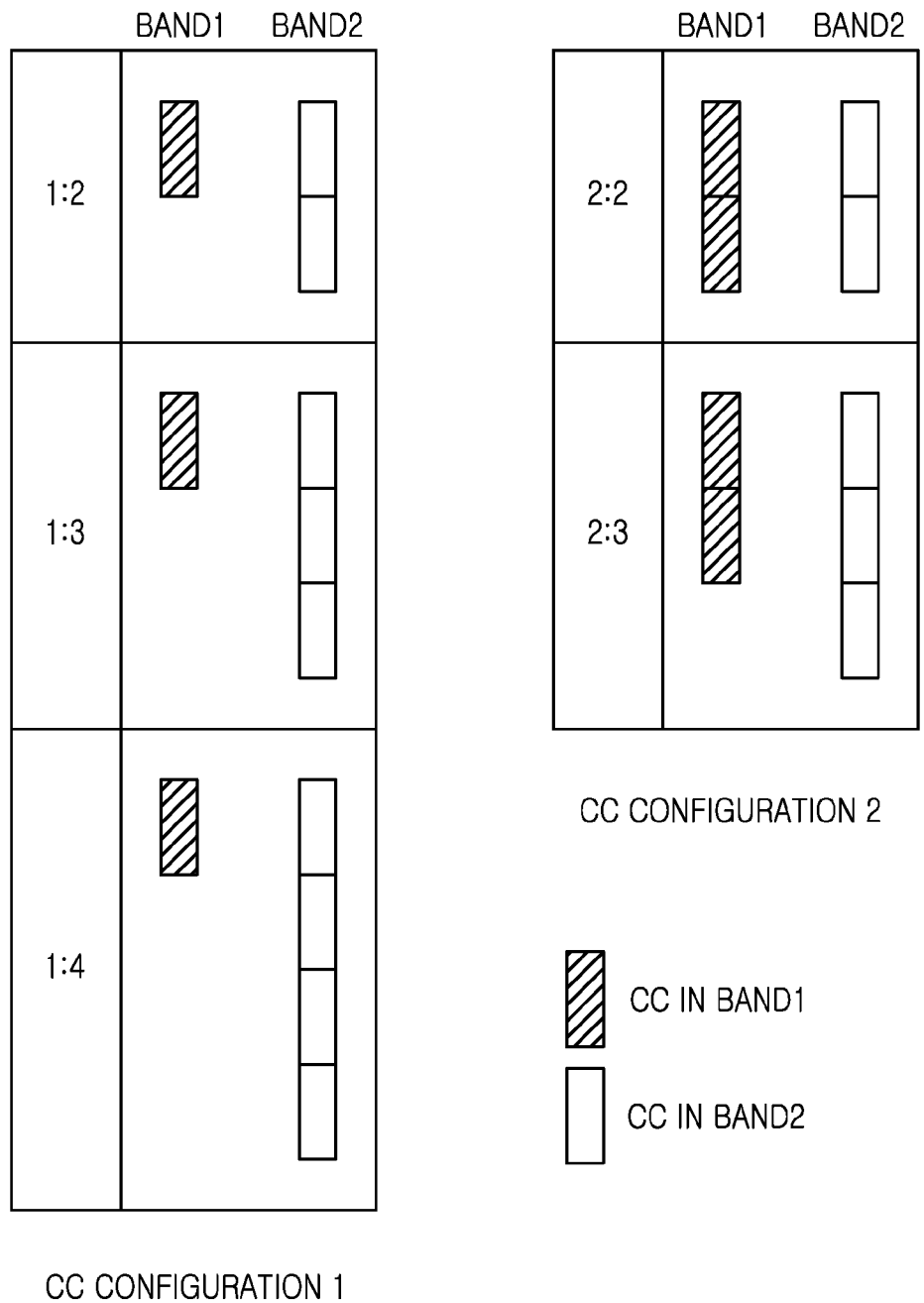
FIG. 3 is a schematic diagram illustrating examples of Component Carrier (CC) allocations in a mobile communication system according to the related art.
Figure 4:
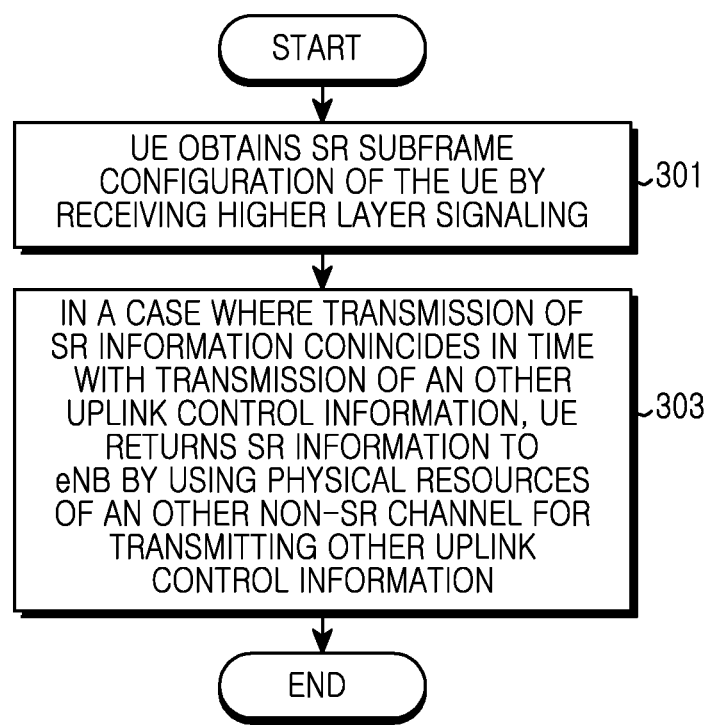
FIG. 4 illustrates a SR transmission procedure in a mobile communication system according to an exemplary embodiment of the present invention.

FIG. 4 illustrates a SR transmission procedure in a mobile communication system according to an exemplary embodiment of the present invention.

Referring to FIG. 4, in step 301, a User Equipment (UE) obtains a SR subframe configuration of the UE by receiving higher layer signaling. For example, the SR subframe configuration includes a SR configuration number. The UE may determine a SR subframe by using the obtained SR configuration number, a table stored by the UE, and an existing system specification. The table stored by the UE may be defined as shown in Table 1 below.

TABLE 1

| SR subframe configuration number $I_{SR}$ | SR cycle (millisecond) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

The determining of the SR subframe includes making the serial number of the determined SR subframe satisfy the following Equation (1).

$$(10 \times n_f \lfloor n_s/2 \rfloor - N_{OFFSET,SR}) \bmod SR_{PERIODICITY} = 0 \quad \text{Equation (1)}$$

In Equation (1), $n_f$ denotes a system frame number, $n_s$ denotes a time slot number, $N_{OFFSET,SR}$ denotes an offset of a SR subframe, $SR_{PERIODICITY}$ denotes a cycle of SR subframes. In the present exemplary embodiment, the SR configuration number obtained by the UE is $I_{SR}=3$, and from Table 1 the SR configuration number can be obtained, wherein $N_{OFFSET,SR}=3$, $SR_{PERIODICITY}=5$, $n_s=\{0,1,\ldots,19\}$ are time slot numbers.

According to the Equation (1), the UE obtains that an uplink resource SR is to be sent in the subframe #3, #8, #11,

14, . . . etc., so as to request a Base Station (BS) to reallocate uplink data resources. Herein, the BS may also be referred as an 'evolved Node B (eNB)'. In order to better describe the method according to the exemplary embodiments of the present invention which is performed when the SR information and other control information are transmitted in a single subframe at the same time, in the exemplary embodiments described below, only subframe #3 is taken as an example, and the principles of other subframes are similar.

In step 303, in a case where the transmission of SR information coincides in time with the transmission of the other uplink control information, the UE returns the SR information to the BS by using physical resources of another non-SR channel for transmitting other uplink control information. That is to say, in step 303, in a case where the transmission of SR information coincides in time with the transmission of the other uplink control information, i.e., the subframe #3, the UE returns the SR information to the BS by using the physical resources of the non-SR channel for transmitting the other uplink control information.

It should be explained that, the methods provided by the exemplary embodiments of the present invention aim at how to return the SR, ACKnowledgement/Non-ACKnowledgement (ACK/NACK) or Channel Quality Indicator (CQI) information to the BS at the same time when uplink Constant Modulus (CM) is minimized, if the UE uses multiple Component Carrier (CCs), especially if the multiple CCs are located at different bands. It can be seen that the other uplink control information in step 303 includes ACK/NACK information and CQI information. In order to make the description of the exemplary embodiments of the present invention more clear, a description is made of operations respectively corresponding to transmitting the SR information and the ACK/NACK information in the same subframe, i.e., the subframe #3 (referred as a first exemplary embodiment) and transmitting the SR information and the CQI information in the same subframe, i.e., the subframe #3 (referred as a second exemplary embodiment).

First Exemplary Embodiment

Solutions according to the first exemplary embodiment may be implemented by using the following three modes.
Mode 1:

In this exemplary embodiment, when transmitting the SR information and the ACK/NACK information at the same subframe, the UE performs joint coding for the SR information and the ACK/NACK information, and returns these by using an ACK/NACK channel distributed to the UE. The operation of performing the joint coding for the SR information and the ACK/NACK information by the UE is illustrated in FIG. 5.

Figure 5:
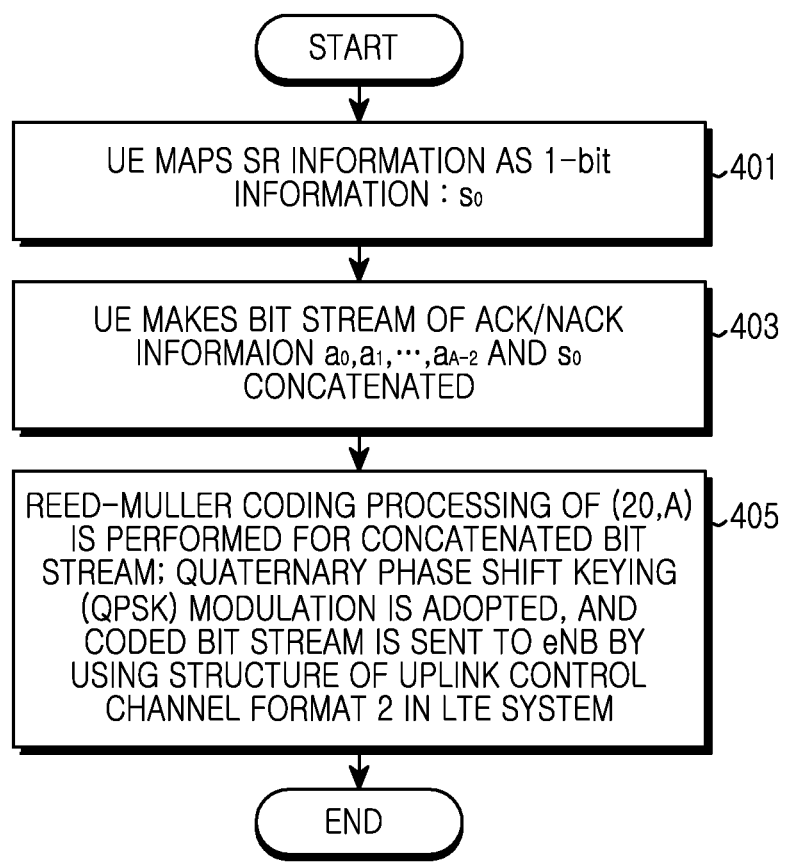
FIG. 5 illustrates a joint coding procedure based on a mode 1 in a mobile communication system according to an exemplary embodiment of the present invention.

FIG. 5 illustrates a joint coding procedure based on a mode 1 in a mobile communication system according to an exemplary embodiment of the present invention.

Referring to FIG. 5, in step 401, the UE maps the SR information as 1-bit information $S_0$. Specifically, the step 401 includes that when the SR information is a positive SR, $S_0=1$, and when the SR information is a negative SR, $S_0=0$. Other mapping modes may be adopted in step 401, and only one example is provided for ease in description.

In step 403, the UE concatenates a bit stream of the ACK/NACK information $a_0, a_1, \ldots, a_{A-2}$ and the $S_0$. The step 403 may include that the $S_0$ and the bit stream of the ACK/NACK information $a_0, a_1, \ldots, a_{A-2}$ are located at predetermined locations. Specifically, the UE locates the $S_0$ in front of the bit stream of the ACK/NACK information $a_0, a_1, \ldots, a_{A-2}$, and obtains $\langle S_0, a_1, \ldots, a_{A-2}\rangle$, or the UE appends $S_0$ at the end of the sequence of the concatenated bit stream of the ACK/NACK information $a_0, a_1, \ldots, a_{A-2}$, and obtains $\langle a_0, a_1, \ldots a_{A-2}, S_0\rangle$.

In step 405, Reed-Muller coding processing of (20, A) is performed for the concatenated bit stream. Herein, (r, m) are RM coding parameters and denote that an order is r, and a length of a binary vector is 2 m. Quaternary Phase Shift Keying (QPSK) modulation is adopted, and the coded bit stream is sent to the BS. For example, the coded bit stream is sent by using a structure of an uplink control channel format 2 in the LTE system.

Thus, the flow of the UE performing joint coding for the SR information and the ACK/NACK information in the present exemplary embodiment is implemented.

In order to make the above mode 1 more clear, a specific exemplary embodiment is described herein.

Figure 6:
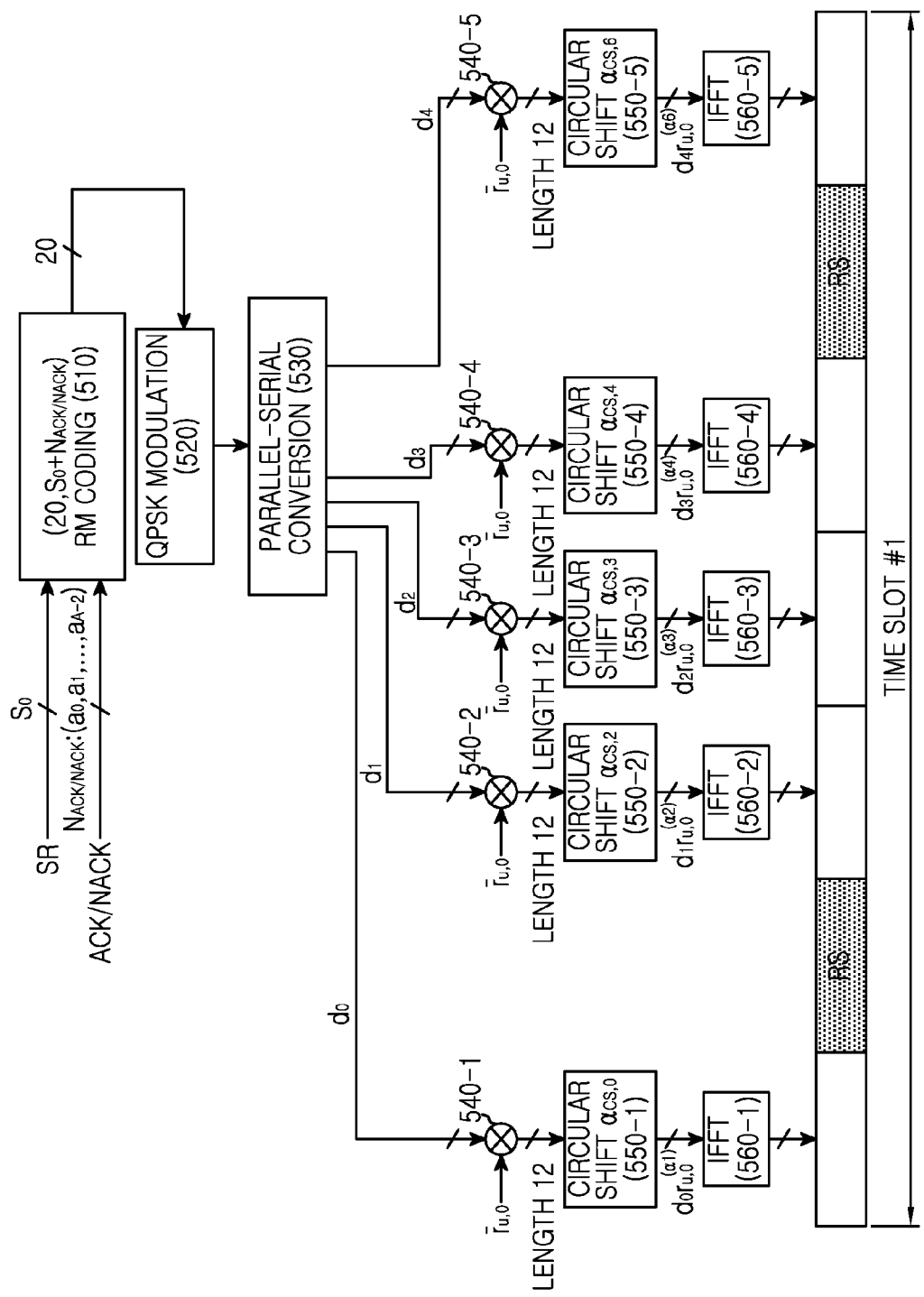
FIGS. 6 and 7 illustrate a data processing procedure based on a mode 1 in a mobile communication system according to an exemplary embodiment of the present invention.
Figure 7:
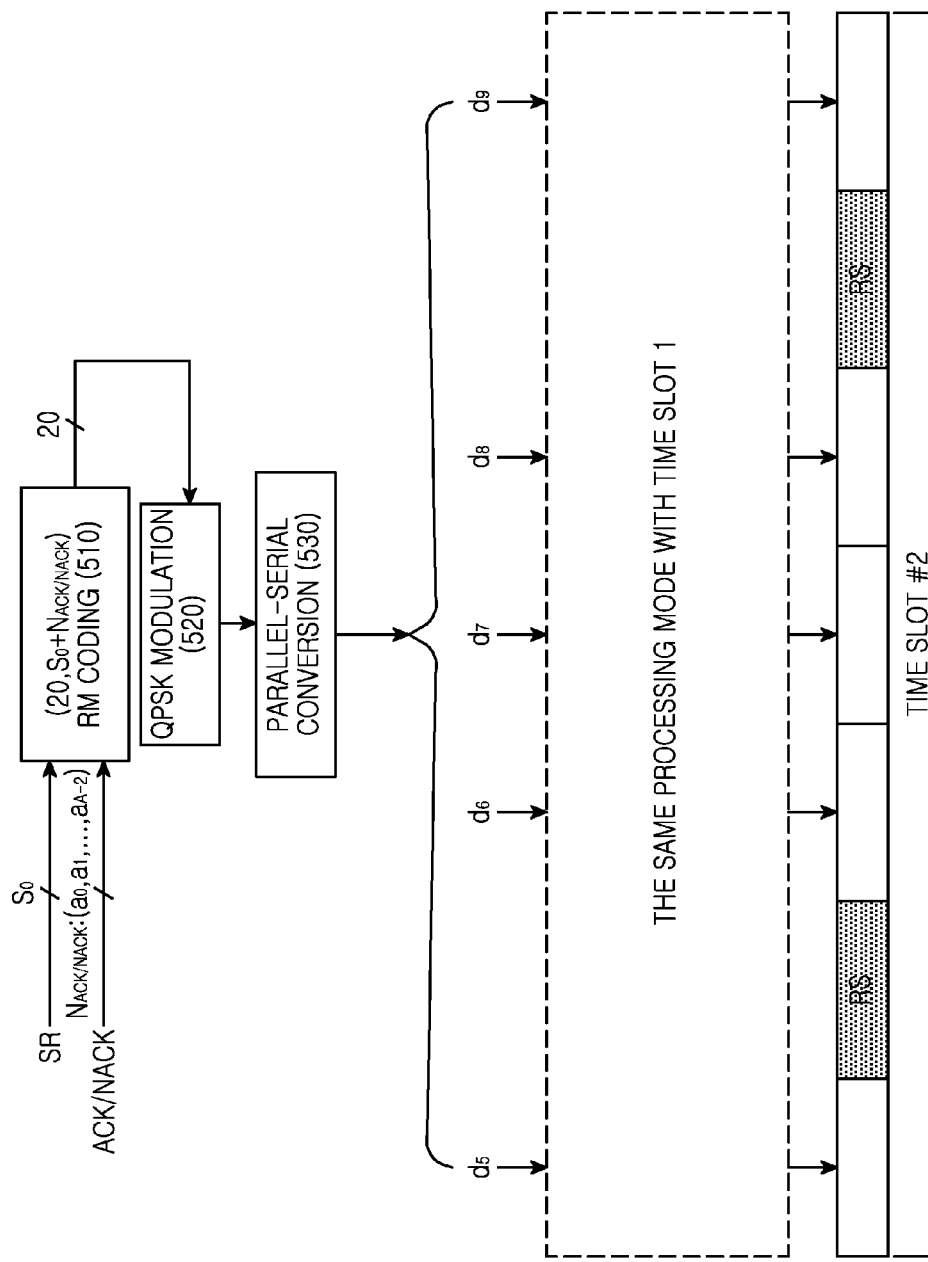

FIGS. 6 and 7 illustrate a data processing procedure based on a mode 1 in a mobile communication system according to an exemplary embodiment of the present invention.

Referring to FIGS. 6 and 7, the SR information and the ACK/NACK information is provided to a RM coding block 510, and a result of RM coding is provided to QPSK modulation block 520. Modulated symbols modulated by the QPSK modulation block 520 are converted into a parallel symbol stream in a parallel-serial conversion block 530, and 10 symbols included the parallel symbol stream are provided to multipliers 540-1 to 540-5 corresponding to a time slot #1 and multipliers (not illustrated) corresponding to a time slot #2. For the multipliers 540-1 to 540-5, a base sequence $\bar{r}_{u,0}$ is multiplied with each symbol, and each symbol is cyclic shifted as $\alpha_{cs,0}$ by a corresponding circular shift block 550-1 to 550-5. Symbols which are multiplied by $\bar{r}_{u,0}$ and are cyclic shifted $\alpha_{cs,0}$ may be represented as $d_0 r_{u,o}^{\alpha 1}$, $d_1 r_{u,o}^{\alpha 2}$, $d_2 r_{u,o}^{\alpha 3}$, and so on. Herein, $r_{u,r}^{(\alpha)}$ denotes a reference signal sequence. After that, symbols multiplied by the reference signal sequence pass through a corresponding one of Inverse Fast Fourier Transform (IFFT) blocks 560-1 to 560-2, and are mapped in time slots.

In FIGS. 6 and 7, it is assumed that the UE requests the BS to reallocate uplink resources, i.e., the UE sends a positive SR in the subframe #3. Thus, according to step 401 (of FIG. 5), it is determined that $S_0=1$; at the same time, the UE also returns ACK/NACK information corresponding to the BS configuring multiple CCs in the subframe #3. It is assumed in the exemplary embodiment of the present invention that the length of ACK/NACK information bits is sent is A-1, the ACK/NACK information bits are $\langle a_0, a_1, \ldots, a_{A-2}\rangle$, without lose of generality, for the sake of convenience, it is taken as an example that A=9, and the bit stream of the ACK/NACK information to be sent is $\langle 0\ 1\ 1\ 1\ 1\ 0\ 1\ 0\rangle$. The UE makes SR information bit, i.e., $S_0$ and the ACK/NACK information bits, i.e., the $\langle 0\ 1\ 1\ 1\ 1\ 0\ 1\ 0\rangle$ concatenated. It is assumed that, in this exemplary embodiment, the SR information bit is located in front of the ACK/NACK information bits, thus the concatenated bit stream of ACK/NACK and SR bits is $\langle c_0, c_1, \ldots, c_{A-1}\rangle = \langle 1\ 0\ 1\ 1\ 1\ 1\ 0\ 1\ 0\rangle$. Afterwards, RM coding of (20, A) is performed for the bit stream output after the concatenation (recorded as $\langle b_0, b_1, \ldots, b_{19}\rangle$), specifically, $$b_i = \sum_{n=0}^{8} (c_n \cdot M_{i,n}) \bmod 2 \text{ herein, } i = 0, 1, 2, \ldots, 19. \quad \text{Equation (2)}$$

In Equation (2), $b_i$ denotes an $i_{th}$ bit of the RM coded bit stream, n denotes a bit index, $c_n$ denotes an nth bit of the concatenated bit stream of the ACK/NACK and the SR, and $M_{i,n}$ denotes a parameter for RM coding. The $M_{i,n}$ may be defined as shown in Table 2 below.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 0 | 0 | 1 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

After RM coding, the UE performs QPSK modulation for the coded bit stream $\langle b_0, b_1, \ldots, b_{19} \rangle$, and obtains a modulation symbol $\langle d_0, d_1, \ldots, d_9 \rangle$, and then returns the modulation symbol $\langle d_0, d_1, \ldots, d_9 \rangle$ to the 13 SR to be sent in the subframe #3, i.e., $S_0=1$. In addition, the UE also needs to return the ACK/NACK information corresponding to the BS configuring multiple CCs in the subframe #3.

Figure 8:
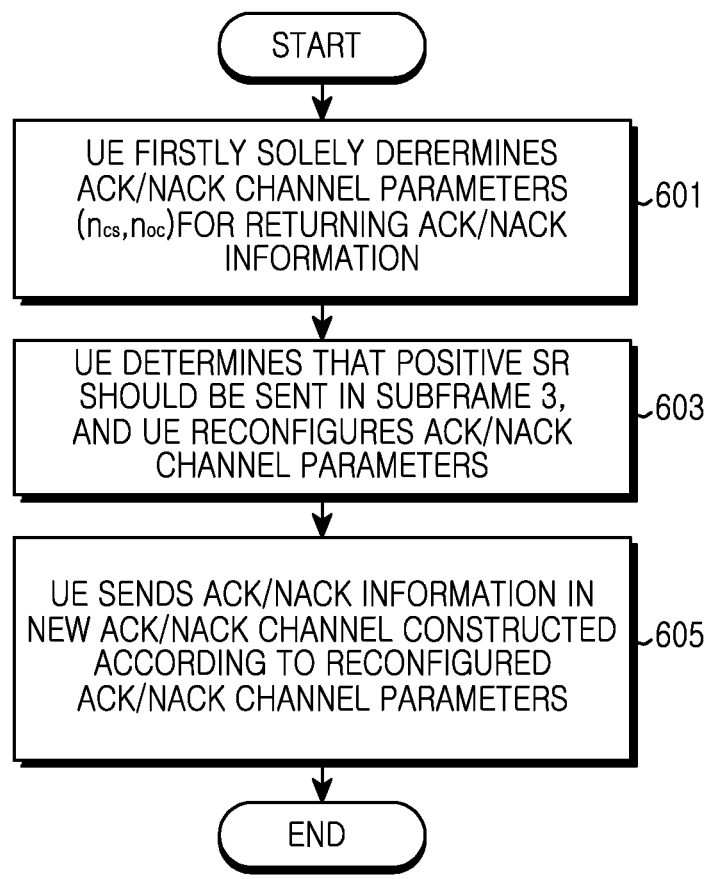
FIG. 8 illustrates an operation procedure based on a mode 2 in a mobile communication system according to an exemplary embodiment of the present invention.

FIG. 8 illustrates an operation procedure based on a mode 2 in a mobile communication system according to an exemplary embodiment of the present invention.

Referring to FIG. 8, the process includes the following steps.

In step 601, the UE firstly solely determines ACK/NACK channel parameters $\langle n_{cs}, n_{oc} \rangle$ for returning the ACK/NACK information. Herein, $n_{cs}$ denotes a cyclic shift index and the $n_{oc}$ denotes an orthogonal sequence index. It is assumed, in the present exemplary embodiment, that the ACK/NACK channel parameters determined by the UE are $n_{cs}=6, n_{oc}=0$. According to relationship between $n_{oc}$ and time domain orthogonal extended codes as shown in the following Table 3, it is obtained that when $n_{cs}=6, n_{oc}=0$, the sequence 0 is taken as the time domain orthogonal extended code, i.e., [+1 +1 +1 +1]. For example, orthogonal codes corresponding to sequence index may be defined as shown in Table 3 below.

TABLE 3

| $n_{oc}$ | Orthogonal code sequence [w(0) w(1) w(2) w(3)] |
|---|---|
| 0 | [+1 +1 +1 +1] |
| 1 | [+1 −1 +1 −1] |
| 2 | [+1 −1 −1 +1] |
| 3 | [−1 +1 −1 +1] |

In step 603, the UE determines that the positive SR should to be sent in the subframe #3, and the UE reconfigures the ACK/NACK channel parameters.

The ACK/NACK channel parameters reconfigured by the UE are $n_{cs}=6, n_{oc}=3$, i.e., the index of CS is not changed, and the ACK/NACK channel is constructed by using a fixed orthogonal extended code $n_{oc}=3$ (orthogonal extended code is [−1 +1 −1 +1]) which is not used in solutions of the related art.

In step 605, the UE sends the ACK/NACK information in a new ACK/NACK channel constructed according to the reconfigured ACK/NACK channel parameters.

It should be explained that, in the above operations, if the UE determines that it is unnecessary to request the BS to reallocate the uplink resources, i.e., the UE should send the negative SR in the current subframe #3, then the UE does not need to reconfigure the ACK/NACK channel parameters of the UE, i.e., the UE does not perform any operation, but returns the ACK/NACK information by using the original ACK/NACK channel.

Figure 9:
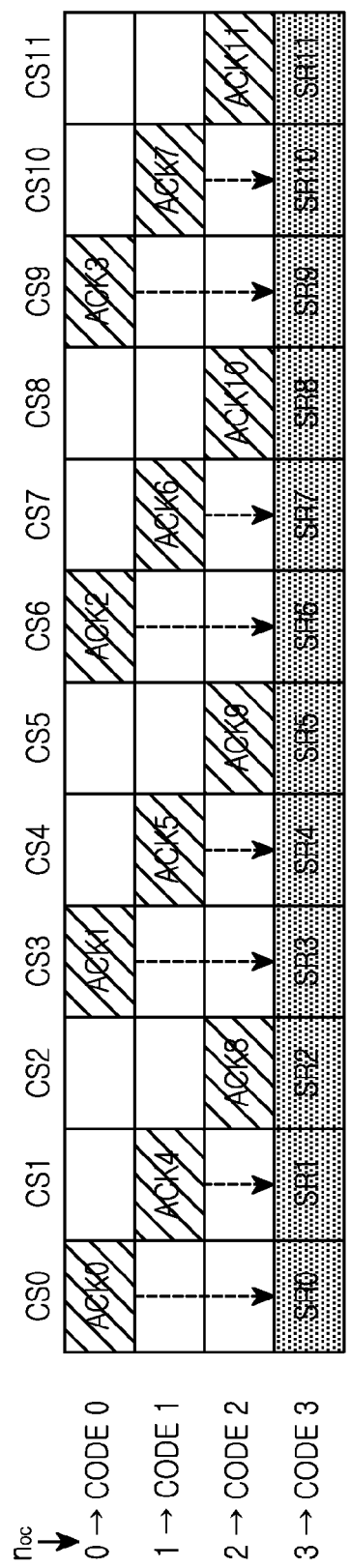
FIG. 9 illustrates a data processing procedure based on a mode 2 in a mobile communication system according to an exemplary embodiment of the present invention.

The above mode 2 is illustrated by FIG. 9.

FIG. 9 illustrates a data processing procedure based on a mode 2 in a mobile communication system according to an exemplary embodiment of the present invention.

Referring to FIG. 9, the ACK/NACK information is generated by using code 0, code 1 or code 2 when not transmitting the SR information, and the ACK/NACK information is generated by using code 3 when transmitting the SR information.

Mode 3:

The mode 3 is relatively simple, specifically, when the SR information and the ACK/NACK information are transmitted in the same subframe. Here, the UE performs coding modulation for the SR information, and returns the SR information to the BS by using channel resources of one Orthogonal Frequency-Division Multiplexing (OFDM) symbol in the uplink ACK/NACK channel structure in the Long Term Evolution (LTE) system. The channel resources of the OFDM symbol include a Constant Amplitude Zero Auto Correlation (CAZAC) code and an orthogonal code sequence of a time domain. The mode 3 is illustrated by FIG. 10.

Figure 10:
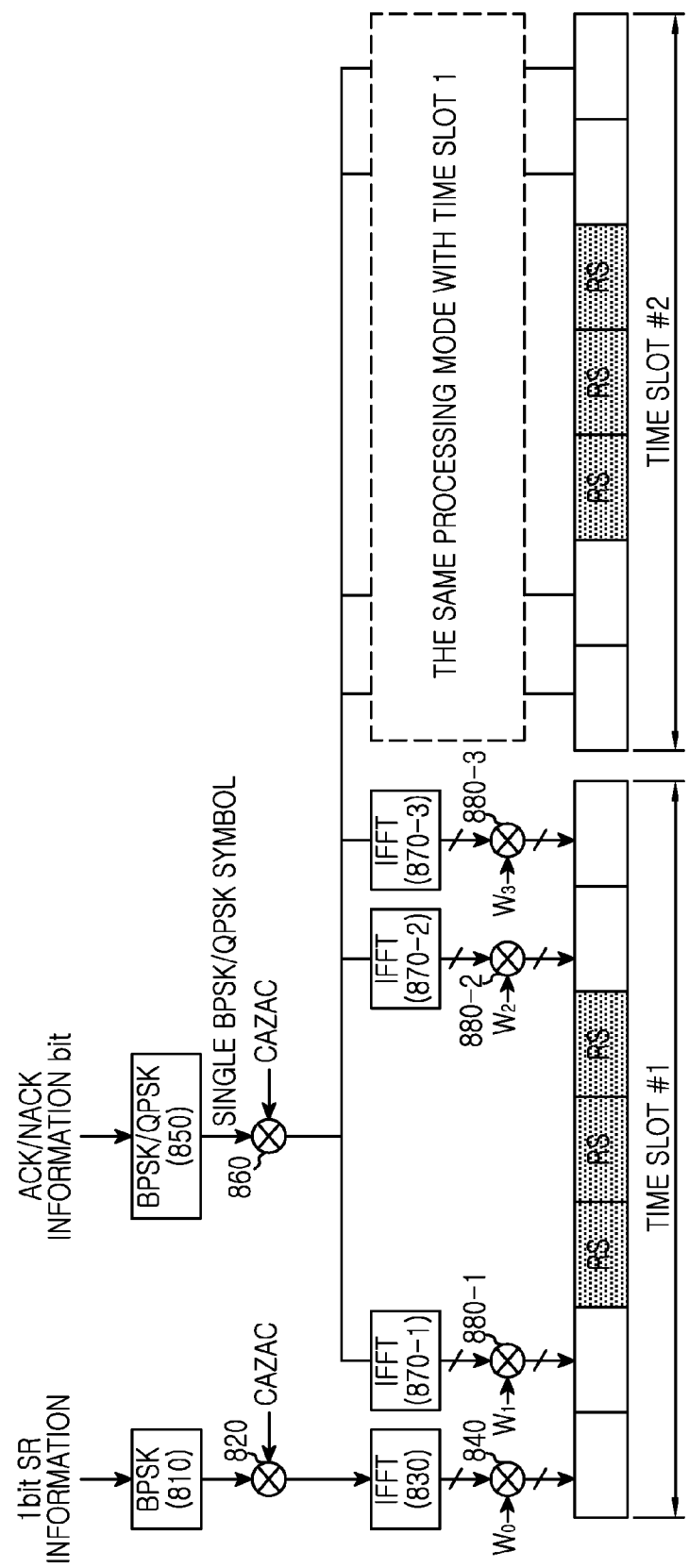
FIG. 10 illustrates a data processing procedure based on a mode 3 in a mobile communication system according to an exemplary embodiment of the present invention.

FIG. 10 illustrates a data processing procedure based on a mode 3 in a mobile communication system according to an exemplary embodiment of the present invention.

Referring to FIG. 10, 1-bit SR information is Binary Phase Shift Keying (BPSK) modulated in BPSK block 810, and is multiplied by a CAZAC sequence in a multiplier 820. After that, a symbol multiplied by the CAZAC sequence is provided to an Inverse Fast Fourier Transform (IFFT) block 830, is multiplied by an orthogonal code 0 in a multiplier 840, and is mapped into time slots. The ACK/NACK information bits are BPSK or QPSK modulated in BPSK/QPSK block 850, and are multiplied by a CAZAC sequence in a multiplier 860. After that, symbols multiplied by the CAZAC sequence are provided to IFFT blocks 870-1 to 870-3, are multiplied by an orthogonal code 1, an orthogonal code 2 or an orthogonal code 3 in multipliers 880-1 to 880-3, and are mapped into time slots.

The implemented modes of the first exemplary embodiment, i.e., transmitting the SR information and the ACK/NACK information in the same subframe are described. The second exemplary embodiment, i.e., transmitting the SR information and the CQI information in the same subframe are described hereinafter.

Second Exemplary Embodiment

Figure 11:
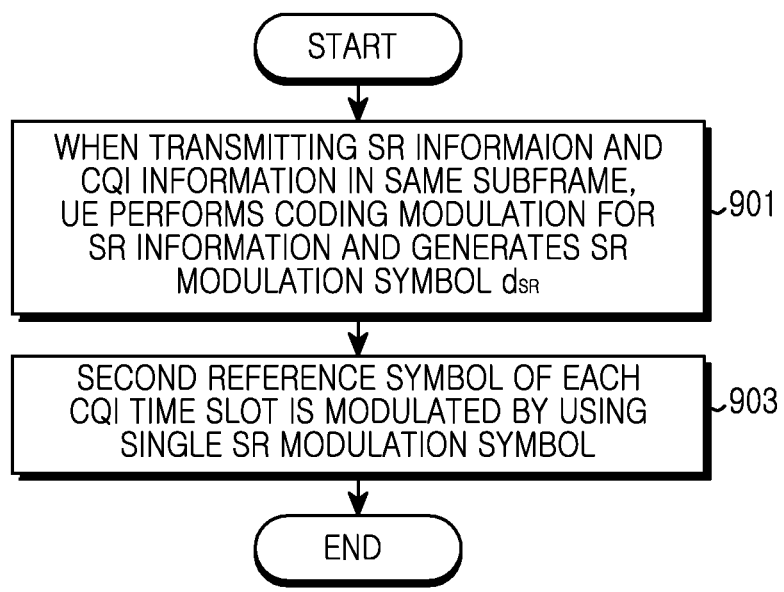
FIG. 11 illustrates a SR transmission procedure in a mobile communication system according to another exemplary embodiment of the present invention.

FIG. 11 illustrates a SR transmission procedure in a mobile communication system according to another exemplary embodiment of the present invention.

Referring to FIG. 11, in step 901, when transmitting the SR information and the CQI information in the same subframe, the UE performs coding modulation for the SR information and generates a SR modulation symbol $d_{SR}$. Specifically, performing coding modulation for the SR information and generating the SR modulation symbol $d_{SR}$ may include mapping the SR information as bit information $s_0$, and performing BPSK modulation for the bit information $s_0$ to generate the SR modulation symbol $d_{SR}$. The operation for mapping the SR information as the bit information $s_0$ may refer to the step 401 (of FIG. 5) described above.

In step 903, a second reference symbol of each CQI time slot is modulated by using a single SR modulation symbol $d_{SR}$. That is, the second reference symbol of each CQI time slot is generated by using the SR modulation symbol $d_{SR}$. Therefore, the second reference symbol of each CQI time slot includes the SR information.

Figure 12:
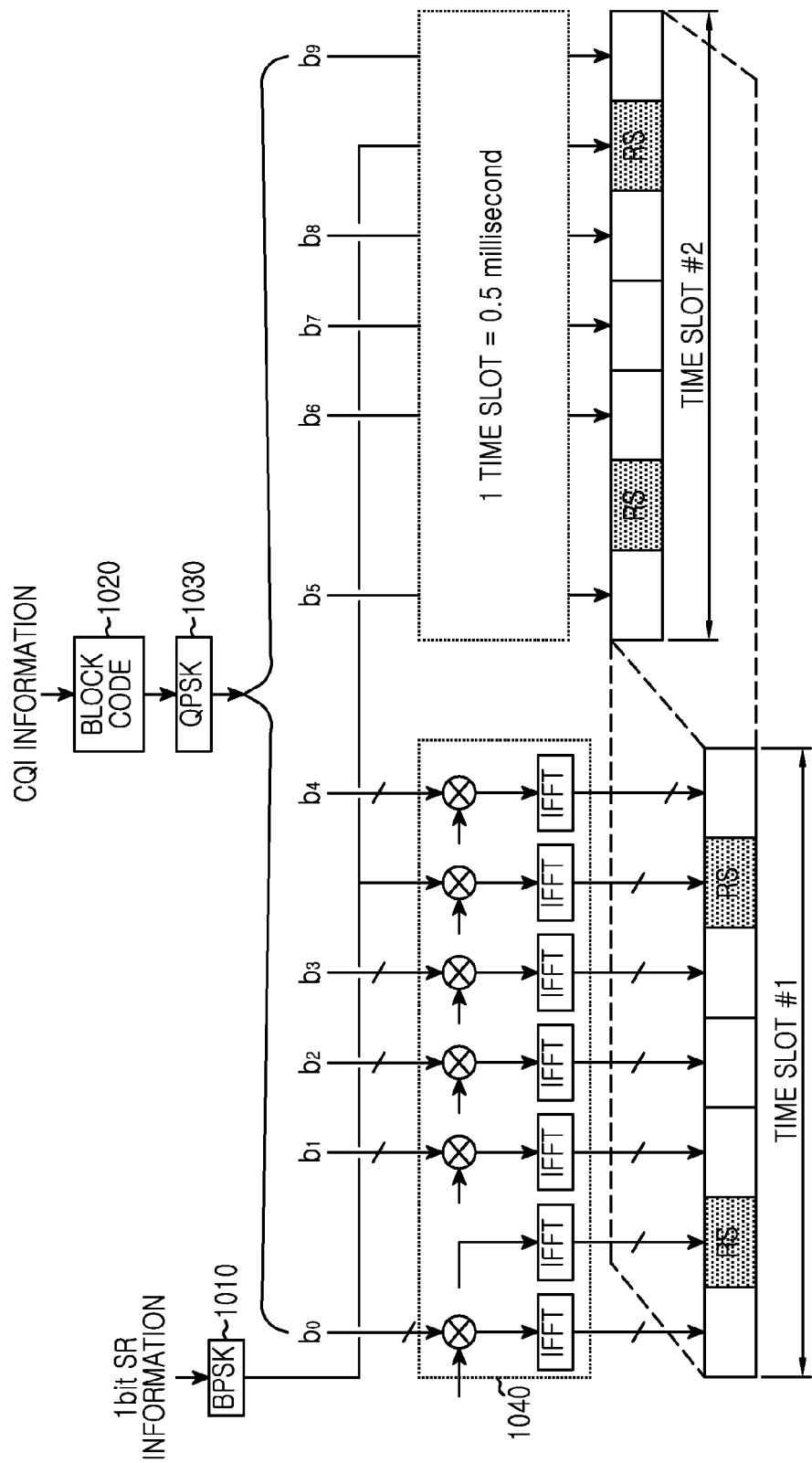
FIG. 12 illustrates a data processing procedure in a mobile communication system according to an exemplary embodiment of the present invention.

The second exemplary embodiment is illustrated by FIG. 12.

FIG. 12 illustrates a data processing procedure in a mobile communication system according to an exemplary embodiment of the present invention.

Referring to FIG. 12, 1-bit SR information is modulated in a BPSK block 1010. The CQI information is block coded in a block code block 1020, and is QPSK modulated in QPSK block 1030. After that, a SR information symbol and CQI information symbols are provided multiplying and IFFT block 1040. The SR information symbol passes though a multiplying operation and an IFFT operation, and is output as the second reference symbol of each CQI time slot. The CQI information symbols and the SR information symbol are mapped into time slots.

Figure 13:
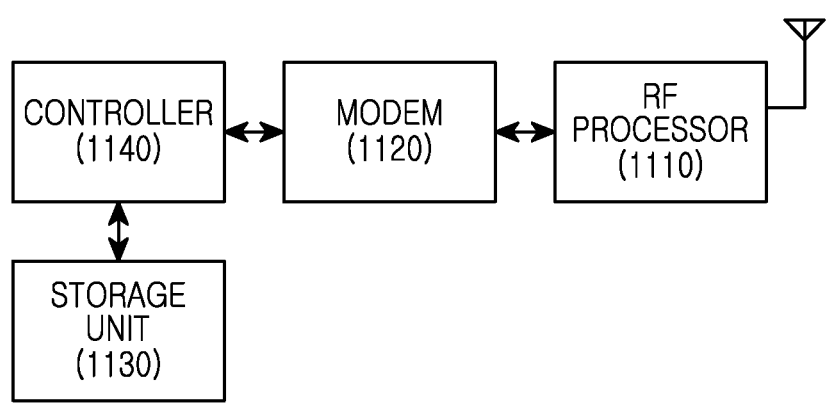
FIG. 13 illustrates a block diagram of a User Equipment (UE) in a mobile communication system according to an exemplary embodiment of the present invention.

FIG. 13 illustrates a block diagram of a UE in a mobile communication system according to an exemplary embodiment of the present invention.

Referring to FIG. 13, the small BS includes a Radio Frequency (RF) processor 1110, a modem 1120, a storage unit 1130, and a controller 1140.

The RF processor 1110 performs functions, such as signal band converting and amplification, to transmit and receive signals over a radio channel. That is, the RF processor 1110 up-converts a baseband signal output from the modem 1120 into the RF signal and transmits the RF signal over an antenna, and down-converts the RF signal received over the antenna into the baseband signal. For example, the RF processor 1110 may include an amplifier, a mixer, an oscillator, a Digital to Analog Convertor (DAC), an Analog to Digital Convertor (ADC) and so on.

The modem 1120 converts the baseband signal and a bit string according to a physical layer standard of the system. For example, to transmit data, the modem 1120 generates complex symbols by encoding and modulating the transmit bit string, maps the complex symbols to subcarriers, and constitutes OFDM symbols by applying IFFT and inserting a Cyclic Prefix (CP). When receiving data, the modem 1120 splits the baseband signal output from the RF processor 1110 into OFDM symbols, restores the signals mapped to the subcarriers using Fast Fourier Transform (FFT), and restores the received bit string by demodulating and decoding the signals. For example, the modem 1120 may include a structure as illustrated in FIG. 6, FIG. 7, FIG. 10, or FIG. 12.

The storage unit 1130 stores program codes and system information required for the operations of the UE. The storage unit 1130 provides stored data to the controller 1140 upon a request from the controller 1140.

The controller 1140 controls the functions of the UE. For example, the controller 1140 generates a transmit packet and a message and provides the modem 1140 with the transmit packet and the message. And, the controller 1140 processes a received packet and a message from the modem 1120. More particularly, according to an exemplary embodiment of the present invention, the controller 1140 controls functions to transmit the SR information and other uplink control information. For example, the controller 1140 controls so that the UE operates as illustrated in one of FIG. 4 to FIG. 12.

As can be seen from the above technical scheme, in the exemplary embodiments of the present invention, when transmitting the SR information and other uplink control information in the same subframe, the UE returns the SR information to the BS by using physical resources on another non-SR channel for transmitting the other uplink control information, that is to say, the UE does not return the SR information to the BS by using a special SR channel, but returns the SR information to the BS by using physical resources on another non-SR channel for transmitting the other uplink control information, which ensures a low CM characteristic of an uplink CC when the SR, ACK/NACK or CQI information is returned to the BS.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in forms and details may be made without departing from the spirit and scope of the invention as defined by the appended claims and their equivalents.

The invention claimed is:

1. A method for transmitting an uplink scheduling request (SR), the method comprising:
   generating uplink control information including SR information and acknowledgement (ACK) information; and
   transmitting the uplink control information through a control channel,
   wherein the SR information indicates one of a positive SR and a negative SR.

2. The method of claim 1, wherein the transmitting of the uplink control information comprises:
   performing joint coding for the SR information and the ACK information based on a set of predefined sequences, and
   transmitting the SR information and the ACK information by using an acknowledgement/non-acknowledgement (ACK/NACK) channel distributed to a user equipment (UE).

3. The method of claim 2, wherein the performing of the joint coding for the SR information and the ACK information comprises:
   mapping the SR information as 1-bit information,
   concatenating the 1-bit information and a bit stream of the ACK information with a length of A, and
   performing Reed-Muller coding processing of (20, A) for the concatenated bit stream.

4. The method of claim 3, wherein the mapping of the SR information as 1-bit information comprises:
   locating the 1-bit information in front of the bit stream or at the end of the bit stream of the ACK information.

5. The method of claim 1, wherein the transmitting of the uplink control information comprises:
   performing modulation for the uplink control information, and
   transmitting the uplink control information to the BS by using channel resources of one orthogonal frequency-division multiplexing (OFDM) symbol in an uplink acknowledgement/non-acknowledgement (ACK/NACK) channel.

6. The method of claim 5, wherein the channel resources of the OFDM symbol comprise a constant amplitude zero auto correlation (CAZAC) code and an orthogonal code sequence of a time domain.

7. The method of claim 1, wherein the transmitting of the uplink control information comprises:
   determining acknowledgement/non-acknowledgement (ACK/NACK) channel parameters that are a cyclic shift index and a orthogonal sequence index,
   determining whether the SR information is the positive SR,
   when the SR information is the positive SR, reconfiguring the orthogonal sequence index, and transmitting the SR information and the ACK information to the BS by using an ACK/NACK channel constructed according to the cyclic shift index and the reconfigured orthogonal sequence index, and
   when the SR information is not the positive SR, transmitting the SR information and the ACK information by using an ACK/NACK channel constructed according to the cyclic shift index and the orthogonal sequence index.

8. The method of claim 7, wherein the reconfiguring of the orthogonal sequence index comprises:
   determining a value of the orthogonal sequence index as a fixed value.

9. The method of claim 8, wherein an orthogonal sequence corresponding to the fixed value comprises [−1 +1 −1 +1].

10. The method of claim 1, wherein the transmitting of the uplink control information comprises:
    generating a SR modulation symbol by modulating for the SR information, and
    modulating a second reference symbol of each channel quality indicator (CQI) time slot by using the SR modulation symbol.

11. The method of claim 10, wherein the generating of the SR modulation symbol comprises:
    mapping the SR information as 1-bit information, and
    generating the SR modulation symbol by using a binary phase shift keying (BPSK) modulation.

12. The method of claim 11, wherein the mapping of the SR information as 1-bit information comprises:
    determining the 1-bit information as '1' when the SR information is the positive SR, and
    determining the 1-bit information as '0' when the SR information is the negative SR.

13. An apparatus for transmitting an uplink scheduling request (SR), the apparatus comprising:
    at least one processor configured to generate uplink control information including SR information and acknowledgement (ACK) information; and
    a transmitter configured to transmit the uplink control information through a control channel,
    wherein the SR information indicates on of a positive SR and a negative SR.

14. The apparatus of claim 13,
    wherein the at least one processor is further configured to perform joint coding for the SR information and the ACK information based on a set of predefined sequences, and
    wherein the transmitter is further configured to transmit the SR information and the ACK information by using an acknowledgement/non-acknowledgement (ACK/NACK) channel distributed to a user equipment (UE).

15. The apparatus of claim 14, wherein the at least one processor is further configured to:
    map the SR information as 1-bit information,
    concatenate the 1-bit information and a bit stream of the ACK information with a length of A, and
    perform Reed-Muller coding processing of (20, A) for the concatenated bit stream.

16. The apparatus of claim 15, wherein the at least one processor is further configured to locate the 1-bit information in front of the bit stream or at the end of the bit stream of the ACK information.

17. The apparatus of claim 13,
wherein the at least one processor is further configured to modulate the uplink control information, and
wherein the transmitter is further configured to transmit the uplink control information to the BS by using channel resources of one orthogonal frequency-division multiplexing (OFDM) symbol in an uplink acknowledgement/non-acknowledgement (ACK/NACK) channel.

18. The apparatus of claim 17, wherein the channel resources of the OFDM symbol comprise a constant amplitude zero auto correlation (CAZAC) code and an orthogonal code sequence of a time domain.

19. The apparatus of claim 13, wherein the at least one processor is further configured to:
determine acknowledgement/non-acknowledgement (ACK/NACK) channel parameters that are a cyclic shift index and a orthogonal sequence index,
determine whether the SR information is the positive SR,
when the SR information is the positive SR, reconfigure the orthogonal sequence index, and transmit the SR information and the ACK information to the BS by using an ACK/NACK channel constructed according to the cyclic shift index and the reconfigured orthogonal sequence index, and
when the SR information is not the positive SR, transmit the SR information and the ACK information by using an ACK/NACK channel constructed according to the cyclic shift index and the orthogonal sequence index.

20. The apparatus of claim 19, wherein the at least one processor is further configured to determine a value of the orthogonal sequence index as a fixed value.

21. The apparatus of claim 20, wherein an orthogonal sequence corresponding to the fixed value comprises [−1 +1 −1 +1].

22. The apparatus of claim 13, wherein the at least one processor is further configured to:
generate a SR modulation symbol by modulating the SR information, and
modulate the second reference symbol of each channel quality indicator (CQI) time slot by using the SR modulation symbol.

23. The apparatus of claim 22, wherein the at least one processor is further configured to:
map the SR information as 1-bit information, and
generate the SR modulation symbol by using a binary phase shift keying (BPSK) modulation.

24. The apparatus of claim 23, wherein the at least one processor is further configured to:
determine the 1-bit information as '1' when the SR information is the positive SR, and
determine the 1-bit information as '0' when the SR information is the negative SR.

25. The method of claim 1, wherein the generating of the uplink control information comprises:
mapping the SR information as 1-bit information;
appending the 1-bit information to the at least one other bit for the ACK information; and
encoding the bit including the 1-bit information and the at least one other bit.

26. The apparatus of claim 13, wherein the at least one processor maps the SR information as 1-bit information, appends the 1-bit information to the at least one other bit for the ACK information, and encodes the bit including the 1-bit information and the at least one other bit.

* * * * *